(12) United States Patent
Miyaoka et al.

(10) Patent No.: US 11,634,669 B2
(45) Date of Patent: Apr. 25, 2023

(54) AEROSOL DETERGENT COMPOSITION

(71) Applicant: KOBEGOSEI CO., LTD., Ono (JP)

(72) Inventors: Masanobu Miyaoka, Ono (JP); Yuuji Miyaoka, Ono (JP)

(73) Assignee: KOBEGOSEI CO., LTD., Ono (JP)

( * ) Notice: Subject to any disclaimer, the term of this patent is extended or adjusted under 35 U.S.C. 154(b) by 44 days.

(21) Appl. No.: 16/617,572

(22) PCT Filed: May 31, 2018

(86) PCT No.: PCT/JP2018/021096
§ 371 (c)(1),
(2) Date: Nov. 27, 2019

(87) PCT Pub. No.: WO2018/221708
PCT Pub. Date: Dec. 6, 2018

(65) Prior Publication Data
US 2020/0123477 A1   Apr. 23, 2020

(30) Foreign Application Priority Data

May 31, 2017 (JP) .............................. JP2017-108838

(51) Int. Cl.
| | | |
|---|---|---|
| *C11D 7/50* | (2006.01) | |
| *C11D 7/30* | (2006.01) | |
| *C11D 11/00* | (2006.01) | |
| *C11D 17/00* | (2006.01) | |
| *B60S 3/04* | (2006.01) | |

(52) U.S. Cl.
CPC ............ *C11D 7/30* (2013.01); *C11D 11/0023* (2013.01); *C11D 17/0043* (2013.01); *B60S 3/044* (2013.01)

(58) Field of Classification Search
CPC .................................................. C11D 17/0043
USPC ......................................................... 510/407
See application file for complete search history.

(56) References Cited

U.S. PATENT DOCUMENTS

| | | |
|---|---|---|
| 2010/0004155 A1 | 1/2010 | Ishihara et al. |
| 2014/0261565 A1* | 9/2014 | Hulse .................. C11D 11/0029 134/26 |

FOREIGN PATENT DOCUMENTS

| | | |
|---|---|---|
| JP | 10-168498 A | 6/1998 |
| JP | 2001-207199 A | 7/2001 |
| JP | 2002-338953 A | 11/2002 |
| JP | 2010-248443 A | 11/2010 |
| JP | 5121130 B2 | 1/2013 |
| JP | 2014-181405 A | 9/2014 |
| JP | 2017-43742 A | 3/2017 |
| JP | 2017-200989 A | 11/2017 |
| WO | 2008/053656 A1 | 5/2008 |

OTHER PUBLICATIONS

International Search Report dated Jul. 10, 2018, issued in counterpart application No. PCT/JP2018/021096, w/English translation (5 pages).

* cited by examiner

*Primary Examiner* — Gregory E Webb
(74) *Attorney, Agent, or Firm* — WHDA, LLP

(57) ABSTRACT

A nonflammable aerosol composition for washing various types of car/vehicle is of low toxicity, which has little environmental impact in terms of depletion of the ozone layer and so forth, which has a washability as good as or better than conventional products such as has been unattained by aqueous products or high-flash-point products, which permits achievement of appropriate drying characteristics, and which, while preventing erosion of rubbers and resins, causes dirt components to be moistened and washed off and away therefrom by the detergent composition, and which permits accommodation of mechanization by virtue of its being capable of being sprayed thereonto from a roughly constant distance therefrom, said aerosol composition for washing is made to contain (Z)-1-chloro-3,3,3-trifluoropropene and gas propellant which is $N_2$, compressed air, $CO_2$, argon, or a mixture of two or more thereof.

2 Claims, No Drawings

AEROSOL DETERGENT COMPOSITION

TECHNICAL FIELD

This invention relates to a novel aerosol detergent composition for use in washing automobiles, two-wheeled vehicles, bicycles, construction equipment, farm equipment, aircraft, railroad cars, ships, and/or various other types of car/vehicle/transportation means, which is an aerosol detergent composition for removing lipids adhering to crooks and nannies of car bodies, brake parts, suspensions, wheels, and/or various other types of car parts and/or control devices in the context of various types of car/vehicle/transportation means, and which, being nonflammable, and the hazard of ignition and risk of fire thereof being low, and which, because it falls within the definition of a nonhazardous material under the Fire Prevention Law, does not require a hazardous material storage warehouse, and which is not subject to legal restrictions with respect to amounts that may be stored when the detergent composition is to be used in large quantities, and which moreover is of low toxicity, and which in addition has superior properties in that the environmental impact thereof in terms of depletion of the ozone layer and so forth is small, and which moreover also has superior properties in that it possesses washability, drying characteristics, and ability to prevent redeposition of dirt that are as good as or better than is the case with conventional detergent compositions.

BACKGROUND ART

Automobiles, two-wheeled vehicles, bicycles, construction equipment, farm equipment, aircraft, railroad cars, ships, and various other types of car/vehicle/transportation means are such that car bodies, brakes, suspensions, wheels, and various other types of parts, devices, and the like are manufactured using metal(s) and/or any of various types of resin and/or the like. Furthermore, with the intention of reducing the weight and/or increasing the decorativeness thereof, members employing composite materials in which resins are combined with metals and so forth have in recent years also been used. Such parts and devices are such that when oily components, dirt, and the like adhere to surfaces thereof during the course of usage thereof, this causes degradation to occur relative to expected properties and attractiveness; and depending on what components adhere thereto, there may be corrosion of metal surfaces and irreversible loss of expected properties and attractiveness. Furthermore, grease and/or other such oily components are applied to necessary locations so as to smoothen the motion of respective devices in car/vehicle/transportation means. However, such oily components are subjected to flow of air, pelting by rainwater, and so forth during operation, as a result of which the oily components gradually flow to unintended locations and so forth; and furthermore, oily components and the like which flow thereto from other car/vehicle/transportation means are hurled up and so forth from the road surface together with dirt and adhere to respective portions of the car/vehicle/transportation means, which is a factor in the decrease which occurs relative to expected properties at the various parts and devices. In particular, in the context of frictional brake devices, often used in car/vehicle/transportation means, in which brake shoes outfitted with brake linings are made to act as braking elements with respect to brake discs, brake drums, and other such rotating bodies, adherence of oily components thereto will cause reduction in the coefficient of friction, and dust produced as a result of wear of brake linings will more easily tend to adhere thereto, which will cause reduction in the braking capability of the brakes. There has therefore been a need to periodically carry out maintenance operations and wash away the oily components and dirt that have entered within and adhered to the crooks and nannies of such parts and devices.

Furthermore, during assembly and manufacture, or reassembly following inspection, of car/vehicle/transportation means, if an oily component or the like continues to adhere to the surface of the part or device, resin or paint will not adhere thereto in stable fashion but will delaminate therefrom and deteriorate and so forth, causing dramatic reduction in product quality. Furthermore, at brakes, suspensions, wheels, and other such parts and devices that are particularly important for maintaining safety during operation, where an oily component or the like continues to adhere thereto there will be decrease in the coefficient of friction, and where these are assembled while still in that state there will be loss of braking ability and so forth, making it impossible to provide expected properties in stable fashion. It is therefore desired during assembly and manufacture, or reassembly following inspection, of various types of car/vehicle/transportation means that oily components adhering to surfaces of the respective parts be washed off and adequately removed from every crook and nanny thereof.

For this reason, conventionally, as a detergent composition for car bodies, brake parts, suspensions, wheels, and so forth of various types of cars, vehicles, and transportation means, substances with good washability having trichloroethane as primary component have been developed and employed for washing cars, vehicles, and transportation means. However, trichloroethane is toxic; moreover, under the terms of the Montreal Protocol on Substances that Deplete the Ozone Layer which was issued under the Vienna Convention for the Protection of the Ozone Layer, production and consumption of trichloroethane in signing countries were to be gradually phased out, being completely eliminated by 1996, and imports and exports with countries nonsignatory to the Protocol were also prohibited or restricted. For this reason, use of detergent compositions employing trichloroethane has come to be avoided.

This being the case, a detergent composition whose washability, drying characteristics, and boiling point have been adjusted and an aerosol product incorporating same have been proposed, use of which has been adopted, in which isohexane, cyclohexane, or other such C6 petroleum-type hydrocarbon is employed as base, with ethanol, isopropyl alcohol, or other such alcohol being added thereto. However, because the foregoing petroleum-type hydrocarbons and alcohols are all highly flammable and are subject to restriction as hazardous materials under the Fire Prevention Law, as it is required for their storage that a hazardous material storage warehouse be provided, they have incurred cost for the provision thereof. Furthermore, even where there is a hazardous material storage warehouse, there are restrictions regarding the amounts that may be stored therein; in particular, while most of the aforementioned detergent compositions are classified as class 4, type 1 petroleums, because the designated quantity of class 4, type 1 petroleums established under applicable ordinance as being capable of being stored in a single warehouse is low, there has been the problem that only small amounts thereof may be stored at facilities where detergent compositions are used notwithstanding that the amounts of the detergent compositions being used are large, improvement with respect to which has been desired. What is more, when operations are being carried out, if an aerosol product incorporating the detergent composition is vigorously sprayed or the like, it is sometimes the case that the gloves and/or clothing of the worker will be soaked by a large amount of the aforementioned detergent composition, which is highly flammable; and inasmuch as the aforementioned detergent composition is highly flammable, where the drying that occurs thereafter is inadequate, there is a risk that an accident could occur due to combustion as a result of a spark from static electricity or a cigarette, and so even where safety has been definitively ensured at the working environment, improvement has still been desired so that use of such highly flammable components might be avoided. Moreover, while the aforementioned hydrocarbons do not have toxicity to the extent that trichloroethane does, because there is a danger that inhalation of excessive quantities could result in hydrocarbon poisoning, it is necessary that they be used in an environment which is either outdoors or which if indoors is equipped with ventilation equipment or is otherwise ventilated, and products are also made to contain written warnings to this effect; but inasmuch as aerosol products are being used, hydrocarbons are present not only at the workplace but are also vaporized and travel downwind therefrom, and so a danger remains that they will be inhaled by persons there, improvement with respect to which has been desired.

While halogen-type solvents are commonly well-known as solvents that do not have a flash point, there being restrictions with respect to manufacture and use of chlorine type substances and bromine-type substances due to the harmfulness thereof, use of these in detergent compositions is problematic. An aqueous product comprising carbitol, alcohol, or the like has therefore been proposed as a product or detergent component having a high flash point that employs a petroleum-type hydrocarbon having a large number of carbons as a way to solve the problem of storage amount and ensurance of safety (see Patent Reference No. 1). However, because the drying characteristics of the aforementioned aqueous composition are extremely poor and slow, as much time as 30 or 40 minutes being required for drying thereof and so forth (see Patent Reference No. 1), there is a tendency following use thereof for liquid from the aqueous composition to remain in regions around the brakes, and if the brakes are used with the liquid still remaining in that state, as this can lead to a situation in which this has a very serious effect, i.e., reduction in braking force, it has been essential that work operations in which adequate drying is carried out be performed following washing, which complicates matters, improvement with respect to which has been desired. Also, because it aqueous, the washability thereof is inferior to conventional detergent compositions which are used as brake cleaner, and because, depending on the type of dirt, the washing capability thereof is not necessarily adequate, there have been limits with respect to the sites at which it may be used, improvement with respect to which has been desired so as to increase the universality thereof.

On the other hand, as a substance suited to washing of metal materials, the Applicant has proposed an aerosol product employing a foam-type agent for removal of dirt that has accumulated on metal surfaces without causing detergent components to be scattered about the surrounding region as a substance for removing dirt from metal surfaces having concavities such as dies (Patent Reference No. 2). However, because it is aqueous and because—since the agent for removal of dirt accumulates on metal surfaces after foaming—the foamed agent for removal of dirt must be wiped therefrom together with dirt using a rag, to make the aforementioned proposed substance suitable for washing of assembled products such as brakes and other such braking devices in various types of cars, vehicles, and transportation means, this causes such operations to be made extremely complicated, with large quantities of waste materials being discharged therefrom, and makes mechanization of washing difficult to accommodate, further improvement with respect to which has been desired.

(Z)-1-chloro-3,3,3-trifluoropropene is also known as a solvent which is capable of being used to wash metal. However, as (Z)-1-chloro-3,3,3-trifluoropropene has high erosivity with respect to resins and elastomers (Nonpatent Reference No. 1), it is necessary to perform adequate examination of sites where it is to be used. In particular, brakes and other such braking devices, lights, windows, and the like are important components for which it is desired that safety be maintained to a high degree in automobiles, two-wheeled vehicles, bicycles, construction equipment, farm equipment, aircraft, railroad cars, ships, and various other types of car/vehicle/transportation means, and materials comprising polycarbonate, acrylic, ABS, polystyrene, silicone rubber, natural rubber, HNBR, NBR, fluorinated rubber, urethane rubber, and/or other such types of resins and elastomers are used in combination with principal members made up of metal; for example, brakes are controlled by means of the pneumatic pressure of brake fluid, the interiors of rubber hoses that interconnect devices which are made of metal ordinarily being filled with such brake fluid. However, among the substances that are used in combination with metal in important components of the aforementioned car/vehicle/transportation means, (Z)-1-chloro-3,3,3-trifluoropropene causes devitrification of polycarbonate, causes acrylic, ABS, and polystyrene to be dissolved, and causes silicone rubber, natural rubber, HNBR, NBR, fluorinated rubber, and urethane rubber to undergo swelling (Nonpatent Reference No. 1). For this reason, if such substances are allowed to come in contact with large quantities of (Z)-1-chloro-3,3,3-trifluoropropene, there is concern that there could be a decrease in safety at important components in car/vehicle/transportation means.

Patent Reference No. 1: Japanese Patent Application Publication Kokai No. 2001-207199

Patent Reference No. 2: Japanese Patent No. 5121130

Nonpatent Reference No. 1: 1233Z, a Superior Environmental Performance and High Washing Power, Next-Generation Fluorinated-Type Solvent; Central Glass Co., Ltd.; catalog issued: October 2015

SUMMARY OF INVENTION

Problem to be Solved by Invention

A problem to be solved by the present invention is to provide a novel aerosol composition which is for washing automobiles, two-wheeled vehicles, bicycles, construction equipment, farm equipment, aircraft, railroad cars, ships, and/or various other types of car/vehicle/transportation means, and which, because it is nonflammable, possesses little hazard of ignition and presents little risk during fire, and which falls within the definition of a nonhazardous material under the Fire Prevention Law and does not require a hazardous material storage warehouse, and which is not subject to legal restrictions with respect to amounts that may be stored when the detergent composition is to be used in large quantities, and which moreover is of low toxicity, and which has properties such that the environmental impact thereof in terms of depletion of the ozone layer and so forth is small, and which permits achievement of appropriate drying characteristics and has a washability as good as or better than that of conventional products such as has not been attained by aqueous products or high-flash-point products, and which, while preventing erosion of rubbers and resins, makes it possible for dirt components to be moistened and washed off and away therefrom by the detergent composition, and which moreover also permits accommodation of mechanization by virtue of its being capable of being sprayed thereonto from a roughly constant distance therefrom.

Means for Solving Problem

To provide a novel aerosol composition for washing car/vehicle/transportation means which might solve the foregoing problems, the present inventors engaged themselves in the task of investigating the properties and washabilities possessed by various compounds and compositions, it being discovered thereamong that when (Z)-1-chloro-3,3, 3-trifluoropropene—which while it is a component capable of being used to wash metal was also known to cause occurrence of deterioration, devitrification, dissolution, and other such serious abnormalities in resins and elastomers—was made into an aerosol composition through employment of LPG—which is frequently used as gas propellant in aerosol compositions—it was found that, as immediately following spraying the LPG evaporated and the (Z)-1-chloro-3,3,3-trifluoropropene was made into fine droplets that spread out over a wide area, the (Z)-1-chloro-3,3,3-trifluoropropene itself, which constituted the detergent component, quickly evaporated, making washing difficult, and that it was necessary to continue to spray an extremely large quantity of the aerosol composition if one were to attempt to make this assume the form of a solution, which caused the sprayed region to undergo freezing, caused moisture to adhere thereto, and caused occurrence of abnormalities. In addition, it was also found that because the (Z)-1-chloro-3, 3,3-trifluoropropene adhered thereto over a wide region that encompassed resins and elastomers used in combination with other materials at important components such as brakes and other such braking devices of car/vehicle/transportation means for which it is desired that safety be maintained to a high degree, there was serious concern that the resins and elastomers could be eroded thereby and that there could be a decrease in safety at important components in car/vehicle/transportation means, making it unsuitable for employment as an aerosol composition for washing car/vehicle/transportation means.

However, the present invention was perfected upon discovering that if $N_2$, compressed air, and/or $CO_2$ was used as gas propellant, this surprisingly made it possible for (Z)-1-chloro-3,3,3-trifluoropropene to not evaporate immediately following spraying but to continue to exist in the form of a solution, and made it possible for the aerosol composition following spraying to be not made into fine droplets that were spread about over a wide area but for it to remain in the form of a solution, being rod-like in shape, as it was delivered in focused fashion over a narrow area, which is to say that it was possible for spraying to be carried out from a long distance to target contaminated locations in pinpoint fashion so as to cause these to be washed off with the solution comprising (Z)-1-chloro-3,3,3-trifluoropropene, and made it possible to carry out washing of contaminated locations at metal portions of important components such as brakes and other such braking devices of car/vehicle/transportation means in such fashion as to avoid resins and elastomers.

A first means in accordance with the present invention for solving the foregoing problems is an aerosol composition for washing automobiles, two-wheeled vehicles, bicycles, construction equipment, farm equipment, aircraft, railroad cars, ships, and/or various other types of car/vehicle/transportation means that is characterized in that it contains (Z)-1-chloro-3,3,3-trifluoropropene and gas propellant which is $N_2$, compressed air, $CO_2$, argon, or a mixture of two or more thereof.

A second means in accordance with the present invention for solving the foregoing problems is the aerosol composition for washing according to the first means of the present invention characterized in that it is for use as a brake cleaner for automobiles, two-wheeled vehicles, bicycles, construction equipment, farm equipment, aircraft, railroad cars, ships, and/or various other types of car/vehicle/transportation means.

BENEFIT OF INVENTION

The (Z)-1-chloro-3,3,3-trifluoropropene that is blended within aerosol compositions in accordance with means of the present invention has no flash point and is nonflammable. This being the case, aerosol compositions in accordance with means of the present invention are such that there is little risk during fire or hazard of ignition under conditions that exist in environments where they are used. In addition, because (Z)-1-chloro-3,3,3-trifluoropropene falls within the definition of a nonhazardous material under the Fire Prevention Law, it does not require a hazardous material storage warehouse and is not subject to legal restrictions with respect to amounts that may be stored when the detergent composition is to be used in large quantities. Furthermore, because each of the foregoing components is of low toxicity and has little environmental impact in terms of depletion of the ozone layer and so forth, the product produced therefrom will be environmentally friendly and gentle in terms of effect on the human body.

However, there is a problem in that if one were to attempt to use (Z)-1-chloro-3,3,3-trifluoropropene as a washing composition by applying it and then wiping it off with a rag, because it dries inordinately quickly, there would be a tendency for lipid components to remain at portions being washed, creating concern that there could be variation in washing effect depending on the degree of skill and proficiency of the worker, and that excessive amounts of solvent might be used if one were to try to reduce the effect of the excessive drying. Furthermore, in the event of immersion, because there is serious concern that resins and elastomers used in combination with other materials at important components in car/vehicle/transportation means could be eroded thereby and that there could be a decrease in safety at important components, such use is precluded. Moreover, it was clear that if LPG, which is frequently used in aerosol compositions, were to be employed as gas propellant, it would be the case that immediately following spraying the LPG would evaporate and the (Z)-1-chloro-3,3,3-trifluoropropene would be made into fine droplets that would be spread about over a wide area and quickly evaporate, which would make washing difficult, and that if, in an attempt to cause this to assume the form of a solution, an extremely large quantity of the aerosol composition were to be continued to be sprayed, the (Z)-1-chloro-3,3,3-trifluoropropene solution, which would be spread about over a wide area, would adhere to resins and elastomers used in combination with other materials at important components in car/vehicle/transportation means, and there would be serious concern that the resins and elastomers could be eroded thereby and that there could be a decrease in safety at important components, making it unsuitable for employment as an aerosol composition for washing car/vehicle/transportation means.

However, aerosol compositions in accordance with means of the present invention, by causing (Z)-1-chloro-3,3,3-trifluoropropene—which has the foregoing problems—to additionally contain gas propellant in the form of $N_2$, compressed air, $CO_2$, argon, or a mixture of two or more thereof, are such that the (Z)-1-chloro-3,3,3-trifluoropropene does not evaporate immediately following spraying but continues to exist in the form of a solution. In addition, extremely useful and remarkable benefits are provided thereby inasmuch as it will be possible for the aerosol composition following spraying to be not made into fine droplets that are spread about over a wide area but for it to remain in the form of a solution, being rod-like in shape, as it is delivered in focused fashion over a narrow area, which is to say that it will be possible for spraying to be carried out from a long distance to target contaminated locations in pinpoint fashion so as to cause these to be washed off with the solution comprising (Z)-1-chloro-3,3,3-trifluoropropene, and it will be possible to carry out washing of contaminated locations at metal portions of important components such as brakes and other such braking devices of car/vehicle/transportation means in such fashion as to avoid resins and elastomers. Furthermore, it has remarkable benefit inasmuch as, because the time necessary for suitable drying is ensured, it will be possible for (Z)-1-chloro-3,3,3-trifluoropropene which has been made into an aerosol composition in accordance with means of the present invention to cause lipid components adhering to portions being washed to be properly washed off after having been brought into miscible contact therewith, and it will moreover be possible to cause portions to quickly assume a dry state following washing. What is more, because it will be possible even when allowing for provision of adequate distance from the spray nozzle of the aerosol composition to the item being washed for it nonetheless to be not made into fine droplets that are spread about over a wide area but for it to remain in the form of a solution, being rod-like in shape, as it is delivered in focused fashion over a narrow area, it provides superior benefit inasmuch as it will make it possible to spray the aerosol composition and carry out washing from a location that is distant therefrom without the need to disassemble the car/vehicle/transportation means so as to expose the device to be washed so as to permit it to be in close proximity to the location to be washed, and also facilitates mechanization of washing operations.

EMBODIMENTS FOR CARRYING OUT INVENTION

Best modes for carrying out the present invention are described with reference to the following descriptions which are given in terms of detergent compositions and aerosol compositions of same that serve as means in accordance with the present invention.
Principal Components
Principal components of an aerosol composition that is a means in accordance with the present invention will now be described. An aerosol composition which is a means in accordance with the present invention contains a detergent component in the form of (Z)-1-chloro-3,3,3-trifluoropropene, and a gas propellant in the form of $N_2$, compressed air, $CO_2$, argon, or a mixture of two or more thereof.

Because the foregoing (Z)-1-chloro-3,3,3-trifluoropropene causes occurrence of deterioration, devitrification, dissolution, and so forth of resins and elastomers (Nonpatent Reference No. 1), when used as a component in a detergent that will be used with resins and elastomers it is preferred that it not be used in a manner that would involve coating, immersion, or the like. Furthermore, if (Z)-1-chloro-3,3,3-trifluoropropene, which is unsuited as a component for blending in such a detergent composition, is made into an aerosol composition through inclusion of gas propellant in the form of LPG, which is frequently used in conventional aerosol compositions, the LPG will evaporate immediately following spraying. For this reason, (Z)-1-chloro-3,3,3-trifluoropropene is made into fine droplets that are spread about over a wide area and quickly evaporate, which makes washing difficult, and if in an effort to address this the amount that is sprayed is increased, not only will (Z)-1-chloro-3,3,3-trifluoropropene, which causes occurrence of deterioration, devitrification, dissolution, and so forth of resins and elastomers, be made to adhere over a wide area, but it will also be the case that, because such locations undergo freezing, causing moisture to adhere thereto, this will make it unsuited for use in washing brakes and other such important components in car/vehicle/transportation means where resins and elastomers are used in combination with other materials.

But if (Z)-1-chloro-3,3,3-trifluoropropene which is unsuited as a component for blending in such a detergent composition is made into an aerosol composition that is also made to contain gas propellant in the form of $N_2$, compressed air, $CO_2$, argon, or a mixture of two or more thereof, it will be the case that the (Z)-1-chloro-3,3,3-trifluoropropene will not evaporate immediately following spraying but will continue to exist in the form of a solution. For this reason, it will be possible for the aerosol composition following spraying to be not made into fine droplets that are spread about over a wide area but for it to remain in the form of a solution, being rod-like in shape, as it is delivered in focused fashion over a narrow area, which is to say that it will be possible for spraying to be carried out from a long distance to target contaminated locations in pinpoint fashion so as to cause these to be washed off with the solution comprising (Z)-1-chloro-3,3,3-trifluoropropene. As a result, it is possible to provide a novel aerosol composition that provides superior effect in that it makes it possible to carry out washing operations in which (Z)-1-chloro-3,3,3-trifluoropropene is sprayed and washes off contaminated locations at metal portions of important components such as brakes and other such braking devices of car/vehicle/transportation means while avoiding resins and elastomers that would be eroded by (Z)-1-chloro-3,3,3-trifluoropropene.

(Z)-1-chloro-3,3,3-trifluoropropene

The aforementioned detergent composition and aerosol composition of same that are means in accordance with the present invention are made to contain (Z)-1-chloro-3,3,3-trifluoropropene, this being one of the two essential components that are contained therein. As the (Z)-1-chloro-3,3,3-trifluoropropene, substances commercially available under the name of 1233Z (Central Glass Co., Ltd.; Japan) and the like as hydrofluoroolefinic solvents may be obtained and used.

(Z)-1-chloro-3,3,3-trifluoropropene is a nonflammable solvent having no flash point and also having no combustible range as defined at ASTM E681 explosive limit test methods. Furthermore, the chemical properties thereof are such that it is environmentally friendly in that its ozone layer depletion potential ODP is substantially zero, its global warming potential GWP is less than 1, and so forth. For this reason, as it is not a component which is subject to the provisions of the Ozone Layer Protection Law, the Law Concerning the Promotion of Measures to Cope with Global Warming, the Law Concerning the Discharge and Control of Fluorocarbons, the Fire Prevention Law, the High Pressure Gas Safety Law, or the like, there are no particular restrictions that apply to its use. With respect to storage thereof, it does not require a hazardous material storage warehouse, and it is not subject to legal restrictions with respect to the amounts thereof that may be stored.

Aerosol Composition

As the gas propellant in the aerosol composition, $N_2$, compressed air, $CO_2$, argon, or a mixture of two or more thereof is used, it being possible for this to be used in the form of liquefied gas or compressed gas. In addition, a detergent composition in accordance with the means of the present invention may be mixed with any of the foregoing gas propellants to form an aerosol composition, and this may be used to fill a pressure-resistant can, in which form it may be provided.

Method of Use

Furthermore, a pressure-resistant can may be filled with an aerosol composition in which detergent composition in accordance with the means of the present invention is mixed with liquefied gas serving as gas propellant to aerosolize it—or detergent composition in accordance with the means of the present invention may be placed in a pail, a small mobile dispenser may be provided at the workplace where this is to be used, and compressed air may be used to aerosolize the detergent composition that has been placed in the pail—and this may be used by causing it to be sprayed in the form of an aerosol on metal members in automobiles, two-wheeled vehicles, bicycles, construction equipment, farm equipment, aircraft, railroad cars, ships, and/or various other types of car/vehicle/transportation means serving as items to be washed. Moreover, because it is possible for the sprayed aerosol to remain in the form of a solution, being rod-like in shape, as it is delivered in focused fashion over a narrow area, it may be used in such fashion as to cause the aerosol composition to be sprayed in pinpoint fashion on only those locations at metal members that are contaminated by lipids and the like so as to cause these to be washed off with the solution comprising (Z)-1-chloro-3,3,3-trifluoropropene and so as to avoid resins and elastomers at important components such as brakes and other such braking devices of car/vehicle/transportation means.

WORKING EXAMPLES

Indicated below in the form of working examples and exemplary tests are examples of manufacture and use of detergent compositions and aerosol compositions of same in accordance with the present invention.

Test Samples

Test samples were prepared. As (Z)-1-chloro-3,3,3-trifluoropropene, which is a component used in the detergent composition in accordance with the present invention, 1233Z (Central Glass Co., Ltd.; Japan) was purchased. Furthermore, as conventional detergents, Brake and Parts Cleaner (Quick-Drying Type) (Kobegosei Co., Ltd.; Japan) employing isohexane was used as quick-drying stock solution; moreover, the following were respectively purchased: Degreasing Cleaner (Honda Access Corporation; Japan) employing cyclohexane which was used as degreasing cleaner; the isoparaffinic solvent Brake Cleaner N04 (Suzuki Motor Corporation; Japan) serving as air-dry stock solution; and also trichloroethane.

In addition, aerosol compositions in accordance with the present invention were manufactured by causing pressure-resistant cans to respectively be filled with the aerosol compositions indicated below at Working Example 1 through Working Example 3.

Working Example 1: Aerosol composition containing (Z)-1-chloro-3,3,3-trifluoropropene and containing gas propellant in the form of $N_2$ Working Example 2: Aerosol composition containing (Z)-1-chloro-3,3,3-trifluoropropene and containing gas propellant in the form of compressed air Working Example 3: Aerosol composition containing (Z)-1-chloro-3,3,3-trifluoropropene and containing gas propellant in the form of $CO_2$ Furthermore, an aerosol composition serving as comparative example was manufactured by causing a pressure-resistant can to be filled with the aerosol composition indicated below at Comparative Example 4. Moreover, conventional detergent compositions were prepared by respectively using quick-drying stock solution, degreasing cleaner, and air-dry stock solution as Comparative Examples 5 through 7. Note that the quick-drying stock solution, the degreasing cleaner, and the air-dry stock solution were all highly combustible; that the trichloroethane was highly harmful; and that these all had properties that would be problematic in the context of a composition for washing.

Comparative Example 4: Aerosol composition containing (Z)-1-chloro-3,3,3-trifluoropropene and containing gas propellant in the form of LPG (liquefied petroleum gas)

Comparative Example 5: Quick-drying stock solution

Comparative Example 6: Degreasing cleaner

Comparative Example 7: Air-dry stock solution

Comparative Example 8: Trichloroethane

Next, the respective Exemplary Tests indicated below were carried out, and it was confirmed in specific terms that aerosol compositions in accordance with the means of the present invention had superior properties.

Exemplary Test 1: Evaluation of Miscibility with Grease and Oil

Materials and Methods

As test samples, Working Examples 1 through 3 and Comparative Examples 4 through 8 were prepared.

As the lipids to be washed and removed, the various types of greases and oils indicated below which are in general use in automobiles and so forth were prepared.

Grease: GREASE (Orange) (Kobegosei Co., Ltd.; Japan)
: Rubber and Brake Dual-Purpose Grease (Kobegosei Co., Ltd.; Japan)
: Disc Brake Grease (Kobegosei Co., Ltd.; Japan)
: Brake Grease (Kobegosei Co., Ltd.; Japan)
: Silicon Grease (Kobegosei Co., Ltd.; Japan)
: Caliper Pin Grease (Honda Access Corporation; Japan)
: Pad & Shoe Grease (Honda Access Corporation; Japan)
: Rubber Grease (Honda Access Corporation; Japan)
: Brake Grease (Honda Access Corporation; Japan)

Oil: Engine Oil Mobil 1 0W-20 (Exxon Mobil; USA)
: Brake Fluid (DOT3) (Honda Access Corporation; Japan)
: Brake Fluid (DOT4) (Suzuki Motor Corporation; Japan)

10-mL vials were prepared, 1 g of the foregoing grease or engine oil being placed into each one thereof. The aerosol compositions and solutions according to Working Examples 1 through 3 and Comparative Examples 4 through 8 were further added to the vials. After the caps of the vials were closed, each of the vials was subjected to ultrasonic processing using an ultrasonic washer (AU16C; Aiwa Medical Industry Co., Ltd.; Japan).

Following ultrasonic processing for 1 hour, the respective vials were removed from the ultrasonic washer. The interiors of the vials were examined, miscibility being evaluated as GOOD if the grease or engine oil and the solutions according to each of Working Examples 1 through 3 and Comparative Examples 4 through 8 were completely mixed, FAIR if these were partly separated, and BAD if these were completely separated.

Test Results

Results of tests carried out as described above are shown at TABLE 1.

had stabilized, amounts corresponding to 100 μL of the compositions and solutions according to Working Examples 1 through 3 and Comparative Examples 4 through 8 were placed in flat dishes, and visual inspection was employed to measure the times until the respective droplets of solution in the flat dishes had completely evaporated and dried.

Test Results

Upon carrying out the aforementioned test, it was found that drying times at 40° C., 25° C., and 10° C. were respectively 1 minute 36 seconds, 2 minutes 11 seconds, and 3 minutes 54 seconds for conventional quick-drying stock solution (Comparative Example 5); were respectively 3 minutes 48 seconds, 5 minutes 58 seconds, and 6 minutes 38 seconds for conventional degreasing cleaner (Comparative

TABLE 1

|  | Working Example 1 | Working Example 2 | Working Example 3 | Comparative Example 4 | Comparative Example 5 | Comparative Example 6 | Comparative Example 7 | Comparative Example 8 |
|---|---|---|---|---|---|---|---|---|
| Component | 1233Z $N_2$ | 1233Z compressed air | 1233Z $CO_2$ | 1233Z LPG | Quick-drying stock solution | Degreasing cleaner | Air-dry stock solution | Trichlorethane |
| GREASE (Orange) | GOOD | GOOD | GOOD | GOOD | BAD | BAD | BAD | GOOD |
| Rubber and Brake Dual-Purpose Grease | GOOD | GOOD | GOOD | GOOD | GOOD | GOOD | GOOD | GOOD |
| Disc Brake Grease | FAIR | FAIR | FAIR | FAIR | FAIR | FAIR | FAIR | GOOD |
| Brake Grease | GOOD | GOOD | GOOD | GOOD | GOOD | GOOD | GOOD | GOOD |
| Silicon Grease | GOOD | GOOD | GOOD | GOOD | GOOD | GOOD | GOOD | GOOD |
| Caliper Pin Grease | GOOD | GOOD | GOOD | GOOD | GOOD | GOOD | GOOD | GOOD |
| Pad & Shoe Grease | GOOD | GOOD | GOOD | GOOD | GOOD | GOOD | GOOD | GOOD |
| Rubber Grease | GOOD | GOOD | GOOD | GOOD | FAIR | FAIR | FAIR | GOOD |
| Brake Grease | FAIR | FAIR | FAIR | FAIR | GOOD | GOOD | GOOD | GOOD |
| Mobill 0W-20 | GOOD | GOOD | GOOD | GOOD | GOOD | GOOD | GOOD | GOOD |
| Brake Fluid (DOT3) | GOOD | GOOD | GOOD | GOOD | BAD | GOOD | GOOD | GOOD |
| Brake Fluid (DOT4) | GOOD | GOOD | GOOD | GOOD | BAD | GOOD | GOOD | GOOD |

It was found that Working Examples 1 through 3 and Comparative Example 4, which employed (Z)-1-chloro-3,3,3-trifluoropropene, had generally satisfactory miscibility with respect to various types of greases and oils which are in general use in automobiles, it being clear that these were miscible with a larger number of types of greases and oils than was the case for conventional quick-drying stock solution, degreasing cleaner, or air-dry stock solution (TABLE 1). It is clear from this that employment of (Z)-1-chloro-3,3,3-trifluoropropene makes it possible to achieve a miscibility with respect to greases and oils that is as good as or better than that of conventional detergent compositions, there being adequate potential for it to make it possible for grease, oil, and/or other such dirt adhering to automobiles, two-wheeled vehicles, bicycles, construction equipment, farm equipment, aircraft, railroad cars, ships, and/or various other types of car/vehicle/transportation means to be effectively washed therefrom.

Exemplary Test 2: Evaluation of Drying Characteristics

Materials and Methods

In similar fashion as at Exemplary Test 1, aerosol compositions and solutions according to the foregoing Working Examples 1 through 3 and Comparative Examples 4 through 8 were respectively prepared.

Temperature conditions at a Temperature & Humidity Chamber (HPAV-120-40; Isuzu Seisakusho Co., Ltd.; Japan) were adjusted to be 70% humidity and 40° C., 25° C., or 10° C., 2-cm flat dishes were placed therein, and these were allowed to stand. When the temperatures of the flat dishes Example 6); and were respectively 15 minutes or more, 15 minutes or more, and 10 minutes or more for conventional air-dry stock solution.

On the one hand, at Comparative Example 4 (the aerosol composition containing (Z)-1-chloro-3,3,3-trifluoropropene and containing gas propellant in the form of LPG), which employed LPG, LPG being frequently used in conventional aerosol compositions, the LPG evaporated immediately following spraying, and the (Z)-1-chloro-3,3,3-trifluoropropene was made into fine droplets which also immediately evaporated.

On the other hand, at Working Example 1 (the aerosol composition containing (Z)-1-chloro-3,3,3-trifluoropropene and containing gas propellant in the form of $N_2$), Working Example 2 (the aerosol composition containing (Z)-1-chloro-3,3,3-trifluoropropene and containing gas propellant in the form of compressed air), and Working Example 3 (the aerosol composition containing (Z)-1-chloro-3,3,3-trifluoropropene and containing gas propellant in the form of $CO_2$), the aerosol did not undergo evaporation or the like immediately following spraying but remained in the form of a solution and was rod-like in shape as it was sprayed, being made into a solution comprising (Z)-1-chloro-3,3,3-trifluoropropene, the drying times of which were respectively 0 minutes 57 seconds, 1 minute 37 seconds, and 2 minutes 14 seconds for Working Example 1; were respectively 0 minutes 52 seconds, 1 minute 32 seconds, and 2 minutes 9 seconds for Working Example 2; and were respectively 0 minutes 50 seconds, 1 minute 30 seconds, and 2 minutes 5 seconds for Working Example 3.

From these results, it is clear that the aerosol compositions which employed gas propellant in the form of $N_2$, compressed air, or $CO_2$ in accordance with Working Example 1 through Working Example 3 were such that the (Z)-1-chloro-3,3,3-trifluoropropene was not made into fine droplets that evaporated immediately but remained in the form of a solution and was rod-like in shape as it was sprayed, arriving in the form of a solution at the item being sprayed, where it continued to exist in the form of a solution for a given time. Based on the foregoing, it was all the more clear that use of an aerosol composition employing gas propellant in the form of $N_2$, compressed air, or $CO_2$ permitted attainment of a substance that had adequate potential to cause target dirt to be moistened with and removed by (Z)-1-chloro-3,3,3-trifluoropropene solution.

On the other hand, whereas LPG gas propellant is frequently used in conventional aerosol compositions, it is clear that the aerosol composition of Comparative Example 4 was such that immediately following spraying the LPG, contrary to what might be expected, evaporated, and the (Z)-1-chloro-3,3,3-trifluoropropene was made into fine droplets that also evaporated immediately, it not being the case that this was able to arrive in the form of a solution at the item being sprayed where it might continue to exist in the form of a solution for a given time. It was all the more clear that when gas propellant in the form of LPG, which is frequently used in conventional aerosol compositions, was used in combination with (Z)-1-chloro-3,3,3-trifluoropropene solution, it was difficult to cause target dirt to be moistened with and adequately removed by the (Z)-1-chloro-3,3,3-trifluoropropene solution.

Exemplary Test 3: Evaluation of Gas Propellant Used in Aerosol Composition

Materials and Methods

In similar fashion as at Exemplary Test 1, aerosol compositions according to the foregoing Working Examples 1 through 3 and Comparative Example 4 were respectively prepared.

Investigation was carried out to determine whether any differences in sprayed state, drying time, sprayable distance, or washability were respectively observed as a function of the type of gas employed in the aerosol composition. Using metal plates, aerosol compositions in accordance with the foregoing Working Examples 1 through 3 and Comparative Example 4 were sprayed for 10 seconds from locations separated 5 cm, 10 cm, 50 cm, 1 m, 2 m, and 10 m from the metal plates, visual inspection being employed to observe the sprayed state of the aerosols, the state of the liquid after it was sprayed onto the metal plates, and to measure the time until the liquid had dried.

Test Results

For those which employed gas propellant in the form of $N_2$, compressed air, or $CO_2$ in accordance with Working Example 1 through Working Example 3 which were aerosol compositions that were means in accordance with the present invention, the aerosol did not undergo evaporation or the like immediately following spraying for 10 seconds, but rather the aerosol composition remained in the form of a solution, being rod-like in shape as it was sprayed, and it was confirmed that a small region 5 cm in diameter on the metal plates that were separated 5 cm, 10 cm, 50 cm, and 1 m therefrom could be wetted in focused fashion by the (Z)-1-chloro-3,3,3-trifluoropropene solution. Where $CO_2$ was used, it was found that it was possible to cause this to be sprayed in such fashion that it remained in the form of a solution and was rod-like in shape for internal pressures of the gas within the pressure-resistant can that were up to 0.2 MPa, but that for internal pressures which exceeded this the aerosol became mist-like. It can be understood that by keeping the internal pressure at or below a roughly constant value, it is possible to cause the aerosol to be rod-like in shape such that the aerosol composition can be sprayed in pinpoint fashion on only those desired locations at metal members that are contaminated by lipids and the like and to avoid causing the (Z)-1-chloro-3,3,3-trifluoropropene solution to come in contact with resins and elastomers at important components such as brakes and other such braking devices of car/vehicle/transportation means. Furthermore, with $N_2$ or compressed air, even where internal pressure was greater than 0.2 MPa, the aerosol composition did not become mist-like, it being confirmed that it was possible to cause the aerosol composition to remain in the form of a solution and be rod-like in shape as it arrived at metal plates that were separated by even longer distances as far away as 2 m and 10 m, such that a small region 5 cm in diameter on the metal plates could be wetted in focused fashion by the (Z)-1-chloro-3,3,3-trifluoropropene solution. Where $N_2$ or compressed air is used, it can be understood that it is possible to cause the aerosol composition to remain in the form of a solution and be rod-like in shape as it arrives at metal plates separated by even longer distances, increasing the degrees of freedom with which washing can be carried out while avoiding causing the (Z)-1-chloro-3,3,3-trifluoropropene solution to come in contact with resins and elastomers at important components such as brakes and other such braking devices of car/vehicle/transportation means.

On the other hand, while LPG gas propellant is frequently used in conventional aerosol compositions, because the aerosol composition of Comparative Example 4 was such that immediately following spraying the LPG evaporated, in accompaniment to which the (Z)-1-chloro-3,3,3-trifluoropropene solution also quickly evaporated, and it was not possible for the metal plates to be moistened by the (Z)-1-chloro-3,3,3-trifluoropropene solution, confirming that it was not suitable for washing car/vehicle/transportation means where resins and elastomers are used in combination with other materials at important components.

Exemplary Test 4: Evaluation of Washability of Aerosol Composition

Materials and Methods

In similar fashion as at Exemplary Test 1, aerosol compositions according to the foregoing Working Examples 1 through 3 and Comparative Example 4 were respectively prepared.

Washability of the aerosol compositions was ascertained. A plurality of metal plates that each had a plurality of grooves 1 mm in width and 1 mm in depth on the surface thereof were prepared, and the greases and oils used at Exemplary Test 1 were respectively applied thereto. Aerosol compositions in accordance with Working Examples 1 through 3 and Comparative Example 4 were sprayed for 10 seconds or 30 seconds, with spray distance being varied, and the diameter of the region wetted by solution at the time that the aerosol arrived at the metal plate was measured, and evaluation was carried out such that it was deemed to be EXCELLENT if the solution of the aerosol did not dry but flowed downward and dissolved the grease or oil and caused it to be adequately washed away therefrom so that there was no residue remaining therefrom; GOOD if the solution of the aerosol did not dry but dripped downward therefrom and generally washed away the grease or oil; FAIR if the solution of the aerosol stayed where it was and while causing the grease or oil to be dissolved by the solution of the aerosol was such that the solution of the aerosol dried before it could complete its task so that residue from the grease or oil remained on the metal plate; and BAD if evaporation of the solution of the aerosol from the metal plate caused the grease or oil to remain as it was without being adequately dissolved thereby.

Test Results

For those which employed gas propellant in the form of $N_2$, compressed air, or $CO_2$ in accordance with Working Example 1 through Working Example 3 which were aerosol compositions that were means in accordance with the present invention, upon spraying for 10 seconds it was found that a small region which was 5 cm in diameter on the metal plate could be wetted in focused fashion by the (Z)-1-chloro-3, 3,3-trifluoropropene solution, and that this was able to receive an evaluation of GOOD, as the solution of the aerosol did not dry but dripped downward therefrom and generally washed away the grease or oil. Furthermore, upon spraying for 30 seconds it was found that a small region which was 5 cm in diameter on the metal plate could be wetted in focused fashion by the (Z)-1-chloro-3,3,3-trifluoropropene solution, and that this was able to receive an evaluation of EXCELLENT, as the solution of the aerosol did not dry but flowed downward and dissolved the grease or oil and caused it to be adequately washed away therefrom so that there was no residue remaining therefrom. For those which employed $N_2$ or compressed air, washability of grease and oil on metal plates separated by an even longer distance of 10 m was also ascertained when internal pressure was increased to greater than 0.2 MPa, it being found in each case upon spraying for 90 seconds that a small region 5 cm in diameter on the metal plate could be wetted in focused fashion by the (Z)-1-chloro-3,3,3-trifluoropropene solution, and that this was able to receive an evaluation of GOOD, as the solution of the aerosol did not dry but dripped downward therefrom and generally washed away the grease or oil; and moreover, upon spraying for 180 seconds that a small region 5 cm in diameter on the metal plate could be wetted in focused fashion by the (Z)-1-chloro-3,3,3-trifluoropropene solution, and that this was able to receive an evaluation of EXCELLENT, as the solution of the aerosol did not dry but flowed downward and dissolved the grease or oil and caused it to be adequately washed away therefrom so that there was no residue remaining therefrom. It can be understood that, the sprayed state of the aerosol being rod-like in shape, because it is possible to carry out washing in such fashion that contaminated locations are targeted in pinpoint fashion, and because it is possible to carry out washing in such fashion that the sprayed state of the aerosol is rod-like in shape and contaminated locations are targeted in pinpoint fashion even from longer distances, this makes it possible to carry out washing from a distance, without the need to disassemble the device so that washing may be carried out in close proximity thereto, permitting increase in universality during washing operations in terms of ability to accommodate mechanization and so forth.

On the other hand, because the aerosol composition of Comparative Example 4 was such that immediately following spraying the LPG evaporated, in accompaniment to which the (Z)-1-chloro-3,3,3-trifluoropropene solution also quickly evaporated and spread out over a wide area, it was not possible for the metal plates to be moistened by the (Z)-1-chloro-3,3,3-trifluoropropene solution, and this received an evaluation of BAD, as evaporation of the solution of the aerosol from the metal plate caused the grease or oil to remain as it was without being adequately dissolved thereby. Furthermore, when the metal plates were brought into close proximity with the aerosol spray nozzle, it was found that immediately following spraying the LPG evaporated, and the (Z)-1-chloro-3,3,3-trifluoropropene was made into fine droplets that adhered thereto over a wide area. It can be understood that this will cause there to be an extremely high risk that the (Z)-1-chloro-3,3,3-trifluoropropene solution could come in contact with resins and elastomers used in combination with other materials at important components such as brakes and other such braking devices of car/vehicle/transportation means, and that the resins and elastomers would be eroded thereby, making it unsuitable as an aerosol composition for washing automobiles, two-wheeled vehicles, bicycles, construction equipment, farm equipment, aircraft, railroad cars, ships, and/or various other types of car/vehicle/transportation means.

Exemplary Test 5: Evaluation of Gas Propellant (Gas Mixture) Used in Aerosol Composition Materials and Methods Aerosol compositions employing gas propellants and (Z)-1-chloro-3,3,3-trifluoropropene in accordance with the present invention were also evaluated by mixing the gas propellants used.

In similar fashion as at Exemplary Test 1, pressure-resistant cans were filled with (Z)-1-chloro-3,3,3-trifluoropropene and gas propellant in the form of $N_2$, $CO_2$ and $N_2$, or $CO_2$ to manufacture the substances in accordance with Working Examples 9 through 16. Moreover, the conditions under which these were filled with the gas propellants were established as follows.

Working Example 9: Filling by $N_2$ was carried out until internal pressure reached 0.6 MPa.

Working Example 10: Filling by $CO_2$ was carried out so as to cause internal pressure to be 0.1 MPa, and then filling by $N_2$ was carried out until internal pressure reached 0.6 MPa.

Working Example 11: Filling by $CO_2$ was carried out so as to cause internal pressure to be 0.2 MPa, and then filling by $N_2$ was carried out until internal pressure reached 0.6 MPa.

Working Example 12: Filling by $CO_2$ was carried out so as to cause internal pressure to be 0.3 MPa, and then filling by $N_2$ was carried out until internal pressure reached 0.6 MPa.

Working Example 13: Filling by $CO_2$ was carried out so as to cause internal pressure to be 0.4 MPa, and then filling by $N_2$ was carried out until internal pressure reached Working Example 14: Filling by $CO_2$ was carried out so as to cause internal pressure to be 0.5 MPa, and then filling by $N_2$ was carried out until internal pressure reached 0.6 MPa.

Working Example 15: Filling by $CO_2$ was carried out until internal pressure reached 0.6 MPa.

Furthermore, as comparative examples, Comparative Example 16 which used gas propellant in the form of LPG, the internal pressure of which was chosen to be 0.25 MPa; Comparative Example 17 at which a manually operated spray bottle was filled with (Z)-1-chloro-3,3,3-trifluoropropene; and Comparative Example 18 at which a wash bottle was filled with (Z)-1-chloro-3,3,3-trifluoropropene, were also prepared.

The foregoing Working Examples 9 through 15 and Comparative Examples 16 through 18 were used to respectively investigate sprayed state, degree of dripping, washing zone size, and washability. For Working Examples 9 through 15 and Comparative Example 16, the amount (g) of aerosol composition that was sprayed when spraying was carried out for 2 seconds was first measured. The amount sprayed in 2 seconds was approximately 20 g for each of Working Examples 9 through 12, while the amount sprayed in 2 seconds was less than this for each of Working Examples 13 through 15 and Comparative Example 16. During testing to ascertain washing effect, for Working Examples 9 through 12, spraying time was therefore set to 2 seconds so as to cause the amount sprayed to be approximately 20 g; but for Working Examples 13 through 15 and Comparative Example 16, for which the amount sprayed was smaller, spraying time was set longer than this so as to cause the amount sprayed to be approximately 20 g.

The metal plates used at Exemplary Test 4 were employed, 0.2 g of brake grease being applied in the shape of a circle 36 mm in diameter to the surface of each thereof. Next, Working Examples 9 through 15 and Comparative Examples 16 through 18 were used to spray 20 g of (Z)-1-chloro-3,3,3-trifluoropropene solution on each of the metal plates to which brake grease had been applied, and the sprayed state of the aerosol, as well as the degree of dripping, washing zone size, and washability of the (Z)-1-chloro-3,3,3-trifluoropropene solution, were measured.

Test Results

Results of tests carried out as described above are shown at TABLE 2.

aerosol composition employing gas propellant in the form of $N_2$ will make it possible to carry out washing operations with good efficiency. Moreover, similar to that which was confirmed at the foregoing Exemplary Test, where gas propellant in the form of $CO_2$ is used, because when a pressure-resistant can is filled with $CO_2$ at an internal pressure not greater than 0.2 MPa the (Z)-1-chloro-3,3,3-trifluoropropene solution does not immediately evaporate but is rod-like in shape as it is sprayed, it can be understood that where a contaminated region is focused at a single spot, $CO_2$ may also similarly be employed as gas propellant in combination with an aerosol composition for washing that employs (Z)-1-chloro-3,3,3-trifluoropropene solution.

Moreover, when a pressure-resistant can was filled with gas propellant in the form of $CO_2$ such that the internal pressure thereof reached 0.6 MPa, it was confirmed that the sprayed state stayed mist-like such that the (Z)-1-chloro-3,3,3-trifluoropropene solution was able to arrive at the surface of the metal plate, and that the brake grease which had been applied thereto could be adequately washed therefrom. Furthermore, upon investigating the washing zone size, it was found that the size of the washing zone was 8.00 cm to 9.00 cm, which was larger than that of the nitrogen gas

TABLE 2

| | Criterion | Working Example 9 | Working Example 10 | Working Example 11 | Working Example 12 | Working Example 13 | Working Example 14 | Working Example 15 | Comparative Example 16 | Comparative Example 17 | Comparative Example 18 |
|---|---|---|---|---|---|---|---|---|---|---|---|
| Gas propellant | | $N_2$ | | | $CO_2 + N_2$ | | | $CO_2$ | LPG | (Manually operated spray bottle) | (Wash bottle) |
| Pressure at time filled with $CO_2$ (MPa) | | Not filled with $CO_2$ | 0.1 | 0.2 | 0.3 | 0.41 | 0.5 | 0.6 | | | |
| Pressure after filling with $N_2$ (MPa) | | 0.61 | 0.6 | 0.6 | 0.61 | 0.6 | 0.61 | 0.6 Not filled with $N_2$ | | | |
| Amount sprayed (g/2 seconds) | | 19.35 | 20.16 | 20.09 | 19.25 | 16.19 | 14.98 | 13.61 | 7.57 | | |
| Pressure after spraying (MPa) | | 0.56 | 0.56 | 0.56 | 0.56 | 0.56 | 0.56 | 0.56 | 0.25 | | |
| Sprayed state | Rod-like | Rod-like | Misty-rod-like | Misty-rod-like | Mist-like | Mist-like | Mist-like | Mist-like | Evaporated | Mist-like | Rod-like |
| Washing zone size when spray distance was 20 cm (diameter, cm) | 8 cm or more | 6.25 | 6 | 8.25 | 8 | 9 | 9.75 | 9 | | | |
| Washing zone size when spray distance was 50 cm (diameter, cm) | 8 cm or more | 5.25 | 7.25 | 7.5 | 8 | 8.25 | 8 | 8 | | | |

It was found that the aerosol compositions for washing in accordance with the present invention were such that use of gas propellant in the form of $N_2$ made it possible for the (Z)-1-chloro-3,3,3-trifluoropropene solution to not immediately evaporate but to be rod-like in shape as it was sprayed, such that the solution was able to accurately arrive at the surface of the metal plate being washed even when the distance therefrom was kept to 20 cm or 50 cm, causing the portions at which it arrived to be wetted thereby, and for the solution to adequately drip from such portions, which is to say that following washing the solution did not stay at the contaminated region but flowed downward, causing the washed location to become clean. It was also found that the size of the washing zone was relatively small, being 5.25 cm to 6.25 cm (TABLE 2). It can be understood that where a contaminated region is focused at a single spot, use of an which was rod-like in shape (TABLE 2). In addition, when a pressure-resistant can was filled with gas propellant in the form of a mixture of $N_2$ and $CO_2$ such that the internal pressure thereof reached 0.6 MPa, when filling was carried out beforehand such that $CO_2$ reached 0.2 MPa, it was confirmed that the sprayed state was misty-rod-like, the size of the washing zone being larger than that of the $N_2$ which was rod-like but the size of the washing zone following spraying being smaller than that which existed with $CO_2$ alone, such that the (Z)-1-chloro-3,3,3-trifluoropropene solution was able to arrive arrive at the surface of the metal plate, and that the brake grease which had been applied thereto could be adequately washed therefrom. Furthermore, when filling was carried out beforehand with 0.3 MPa or more of $CO_2$, it was confirmed that the sprayed state stayed mist-like such that the (Z)-1-chloro-3,3,3-trifluoropropene solution was able to arrive at the surface of the metal plate, and that the brake grease which had been applied thereto could be adequately washed therefrom (TABLE 2).

It was found in all cases that the aerosol compositions in accordance with the present invention were able to adequately cause the washed locations to become clean. Furthermore, it was also clear that when a plurality of gas propellants employed in accordance with the present invention were mixed, it was still possible to provide a substance that had adequate washability. It can moreover be understood that substances such as compressed air, the major components of which are $N_2$ and $CO_2$, were also similarly capable of exhibiting washability. Furthermore, it can be understood that aerosol compositions in accordance with the present invention are such that the type(s) of gas propellant(s) employed and the internal pressure(s) thereof at time(s) when pressure-resistant can(s) are filled therewith are such as to permit adjustment over wide ranges depending on the degree to which contamination is concentrated within a small region (or the degree to which it is spread out over a large region) at the location being washed.

On the other hand, with LPG, which is in general use as a gas propellant in conventional aerosol compositions, it was found following spraying that the (Z)-1-chloro-3,3,3-trifluoropropene solution was made into a fine mist and evaporated immediately, such that it was unable to reach the surface of the metal plate being washed to an extent sufficient to cause it to be adequately wetted thereby (TABLE 2). Moreover, presumably due to occurrence of a sudden decrease in temperature as a result of evaporation of the LPG and the (Z)-1-chloro-3,3,3-trifluoropropene solution, it was found that the surface of the metal plate that was sprayed had frozen. Because circumstances that would cause washed locations to freeze, i.e., to be wetted by moisture, are to be avoided in the context of washing of automobiles, two-wheeled vehicles, bicycles, construction equipment, farm equipment, aircraft, railroad cars, ships, and various other types of car/vehicle/transportation means that include brake portions and/or various types of important components, it can be understood that the combination of (Z)-1-chloro-3,3,3-trifluoropropene and LPG is undesirable. Furthermore, at Comparative Example 17, in which a manually operated spray bottle was filled with (Z)-1-chloro-3,3,3-trifluoropropene, the solution became mist-like, such that it did not reach the surface of the metal plate that was meant to be washed thereby (TABLE 2). At Comparative Example 18, in which a wash bottle was filled with (Z)-1-chloro-3,3,3-trifluoropropene, while it was possible for the washing procedure to be carried out such that the solution was ejected in rod-like fashion from the wash bottle to reach the surface of the metal plate (TABLE 2), as this was a completely manual procedure it would not be suited to incorporation in work operations. Note that upon investigating the internal pressure following spraying, it was found that there had been no change in the internal pressure of the LPG that evaporated immediately and did not reach the surface of the metal plate that was meant to be washed thereby. Based on the foregoing, it is thought that the LPG was highly miscible with the (Z)-1-chloro-3,3,3-trifluoropropene solution, and that following spraying the LPG which was highly miscible with the (Z)-1-chloro-3,3,3-trifluoropropene solution evaporated immediately. On the other hand, for those that employed gas propellants in the form of $N_2$, $CO_2$, and mixtures thereof, for which it was possible to cause the (Z)-1-chloro-3,3,3-trifluoropropene solution to reach the item being washed as a result of its having been rod-like in shape, misty-rod-like, or mist-like as it was sprayed, it was found that the internal pressure within the pressure-resistant can had decreased following spraying. Based on the foregoing, it can be understood that it was probably the case that those which employed gas propellant in the form of $N_2$, $CO_2$, or a mixture thereof were such that as, unlike LPG, these would be immiscible with the (Z)-1-chloro-3,3,3-trifluoropropene solution and thus able to contribute to causing the (Z)-1-chloro-3,3,3-trifluoropropene solution to be sprayed from the pressure-resistant can, this would make it possible for these to reach the surface being washed as a result of their being made rod-like in shape, misty-rod-like, or mist-like as they were sprayed, and it can be understood that the same would be true for compressed air which contains similar components, and for noble gases such as argon that have almost no reactivity with respect to other substances.

INDUSTRIAL UTILITY

By causing an aerosol composition to be characterized in that it contains (Z)-1-chloro-3,3,3-trifluoropropene and gas propellant which is $N_2$, compressed air, $CO_2$, argon, or a mixture of two or more thereof, it is possible to provide a novel aerosol composition which is for washing automobiles, two-wheeled vehicles, bicycles, construction equipment, farm equipment, aircraft, railroad cars, ships, and/or various other types of car/vehicle/transportation means, and which, because it is nonflammable, possesses little hazard of ignition or risk during fire, and which falls within the definition of a nonhazardous material under the Fire Prevention Law and does not require a hazardous material storage warehouse, and which is not subject to legal restrictions with respect to amounts that may be stored when the detergent composition is to be used in large quantities, and which moreover is of low toxicity, and which while having properties such that the environmental impact thereof in terms of depletion of the ozone layer and so forth is small, as well as washability and drying characteristics as good as or better than those of conventional detergent compositions which are used as brake cleaner, is such that the sprayed state of the aerosol is rod-like in shape, misty-rod-like, or mist-like, making it possible to cause (Z)-1-chloro-3,3,3-trifluoropropene to be sprayed within a given region, as a result of which it is possible to carry out washing effectively and in such fashion that contaminated locations at automobiles, two-wheeled vehicles, bicycles, construction equipment, farm equipment, aircraft, railroad cars, ships, and various other types of car/vehicle/transportation means are targeted in pinpoint fashion, making it possible to carry out washing from a distance, without the need to disassemble the device that is to be washed at the car/vehicle/transportation means so that washing may be carried out in close proximity to contaminated locations, permitting increase in universality during washing operations in terms of ability to accommodate mechanization and so forth, and is also imparted with superior properties in that it makes it possible to avoid causing resins and elastomers used in combination with other materials in car/vehicle/transportation means to be eroded by (Z)-1-chloro-3,3,3-trifluoropropene.

The invention claimed is:

1. An aerosol composition for washing automobiles, two-wheeled vehicles, bicycles, construction equipment, farm equipment, aircraft, railroad cars, ships, and/or various other types of car/vehicle/transportation means, the aerosol composition consisting of (Z)-1-chloro-3,3,3-trifluoropropene and gas propellant which is at least one of the group consisting of $N_2$, compressed air, $CO_2$ and argon.

2. The aerosol composition for washing according to claim 1 characterized in that it is for use as a brake cleaner for automobiles, two-wheeled vehicles, bicycles, construction equipment, farm equipment, aircraft, railroad cars, ships, and/or various other types of car/vehicle/transportation means.

* * * * *